(12) United States Patent
Chen et al.

(10) Patent No.: US 8,996,961 B2
(45) Date of Patent: Mar. 31, 2015

(54) ERROR CORRECTION CODE RATE MANAGEMENT FOR NONVOLATILE MEMORY

(71) Applicant: Seagate Technology LLC, Cupertino, CA (US)

(72) Inventors: Zhengang Chen, San Jose, CA (US); Jeremy Werner, San Jose, CA (US); Earl T. Cohen, Oakland, CA (US); Ning Chen, San Jose, CA (US); AbdelHakim S. Alhussien, San Jose, CA (US); Erich F. Haratsch, Bethlehem, PA (US)

(73) Assignee: Seagate Technology LLC, Cupertino, CA (US)

( * ) Notice: Subject to any disclaimer, the term of this patent is extended or adjusted under 35 U.S.C. 154(b) by 92 days.

(21) Appl. No.: 13/798,696

(22) Filed: Mar. 13, 2013

(65) Prior Publication Data
US 2014/0164880 A1 Jun. 12, 2014

Related U.S. Application Data

(60) Provisional application No. 61/735,917, filed on Dec. 11, 2012.

(51) Int. Cl.
*G11C 29/10* (2006.01)
*G06F 11/10* (2006.01)

(52) U.S. Cl.
CPC ................................ *G06F 11/1012* (2013.01)
USPC ....................................................... 714/773

(58) Field of Classification Search
CPC ..... G06F 11/1068; G06F 11/10; H03M 13/05
USPC .................. 714/773, E11.034, 792, 796, 780; 375/265
See application file for complete search history.

(56) References Cited

U.S. PATENT DOCUMENTS

| | | | |
|---|---|---|---|
| 8,122,323 B2 | 2/2012 | Leung et al. | 714/774 |
| 8,281,217 B2 | 10/2012 | Kim et al. | 714/763 |
| 8,307,261 B2 | 11/2012 | Wu et al. | 714/766 |
| 8,365,040 B2 | 1/2013 | Weingarten et al. | 714/763 |
| 2008/0282106 A1 | 11/2008 | Shalvi et al. | 714/6 |
| 2010/0241928 A1 | 9/2010 | Kim et al. | 714/763 |
| 2011/0047442 A1* | 2/2011 | Dave et al. | 714/773 |
| 2014/0119113 A1* | 5/2014 | Xia et al. | 365/185.03 |

* cited by examiner

*Primary Examiner* — Guy Lamarre
(74) *Attorney, Agent, or Firm* — Christopher P. Maiorana, PC

(57) ABSTRACT

An apparatus having an interface and a circuit is shown. The interface is coupled to a memory that is nonvolatile. The circuit is configured to (i) read a plurality of codewords from a block in the memory based on a program/erase count associated with the block, (ii) count a number of iterations used to decode the codewords and (iii) decrease a code rate of an error correction coding used to program the block in response to the number of iterations exceeding a threshold.

20 Claims, 5 Drawing Sheets

ERROR CORRECTION CODE RATE MANAGEMENT FOR NONVOLATILE MEMORY

FIELD OF THE INVENTION

The invention relates to nonvolatile memories generally and, more particularly, to a method and/or apparatus for implementing an error correction code rate management for nonvolatile memory.

BACKGROUND

An error correction coded codeword is composed of a user portion and a parity portion. A code rate is defined as a number of user data symbols in a codeword divided by a total number of symbols in the codeword. Lower code rates have stronger protection against errors than higher code rates, but at a cost of more parity overhead. Furthermore, iterative decoding of codewords with different code rates poses challenges to a code rate adjustment policy. The different code rates result in different decoding times that vary with both the code rate and an input raw bit error rate. On-the-fly decoding failure rates should also be kept low to meet throughput performance targets if retries are involved.

SUMMARY

The invention concerns an apparatus having an interface and a circuit. The interface is coupled to a memory that is nonvolatile. The circuit is configured to (i) read a plurality of codewords from a block in the memory based on a program/erase count associated with the block, (ii) count a number of iterations used to decode the codewords and (iii) decrease a code rate of an error correction coding used to program the block in response to the number of iterations exceeding a threshold.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing an error correction code rate management for nonvolatile memory that may (i) increase a longevity of the nonvolatile memory, (ii) meet a throughput performance target, (iii) meet an over provisioning target, (iv) operate at multiple code rates and/or (v) be implemented as one or more integrated circuits.

As nonvolatile (e.g., Flash) memory device technology scales down below 30 nanometers and a number of bits per cell increases, the memory devices suffer more from various noise factors such as program/erase (e.g., P/E) cycling and retention. To improve endurance and extend a useful life of the memory devices, iterative decodable error correction codes are used in a memory controller. The iterative decodable error correction codes, such as low-density parity-check (e.g., LDPC) codes, demonstrate an error correction performance close to a Shannon capacity. Other iterative decodable error correction codes, such as polar codes or turbo codes, may be implemented to meet the criteria of a particular application.

Embodiments of the invention provide a suite of error correction code rate management policies for nonvolatile memory-based storage systems. The error correction code is an iterative decodable code applied to data stored in nonvolatile memory to protect the data against a variety of noises. Given the same code word length, a lower code rate means a stronger error correction code that can correct more errors. The code rate management policy adjusts the code rate to meet multiple targets: a throughput performance target and an over provisioning target. The code rate adjustment comprises multiple (e.g., two) parts triggered by different conditions. A first part (referred to as a read scrub code rate test) is triggered at, for example, predetermined program/erase cycling intervals. Another part (referred to as a read failure code rate test) is an on-demand code rate adjustment when certain read operations fail in part or in the entirety of a code rate management granularity. Bad block management is also part of the code rate management policy in some embodiments. If a lowest code rate available in the policy cannot meet a minimal criterion, a nonvolatile memory block is declared bad and retired. The block retirement policy is designed to meet the over provisioning target.

Figure 1:
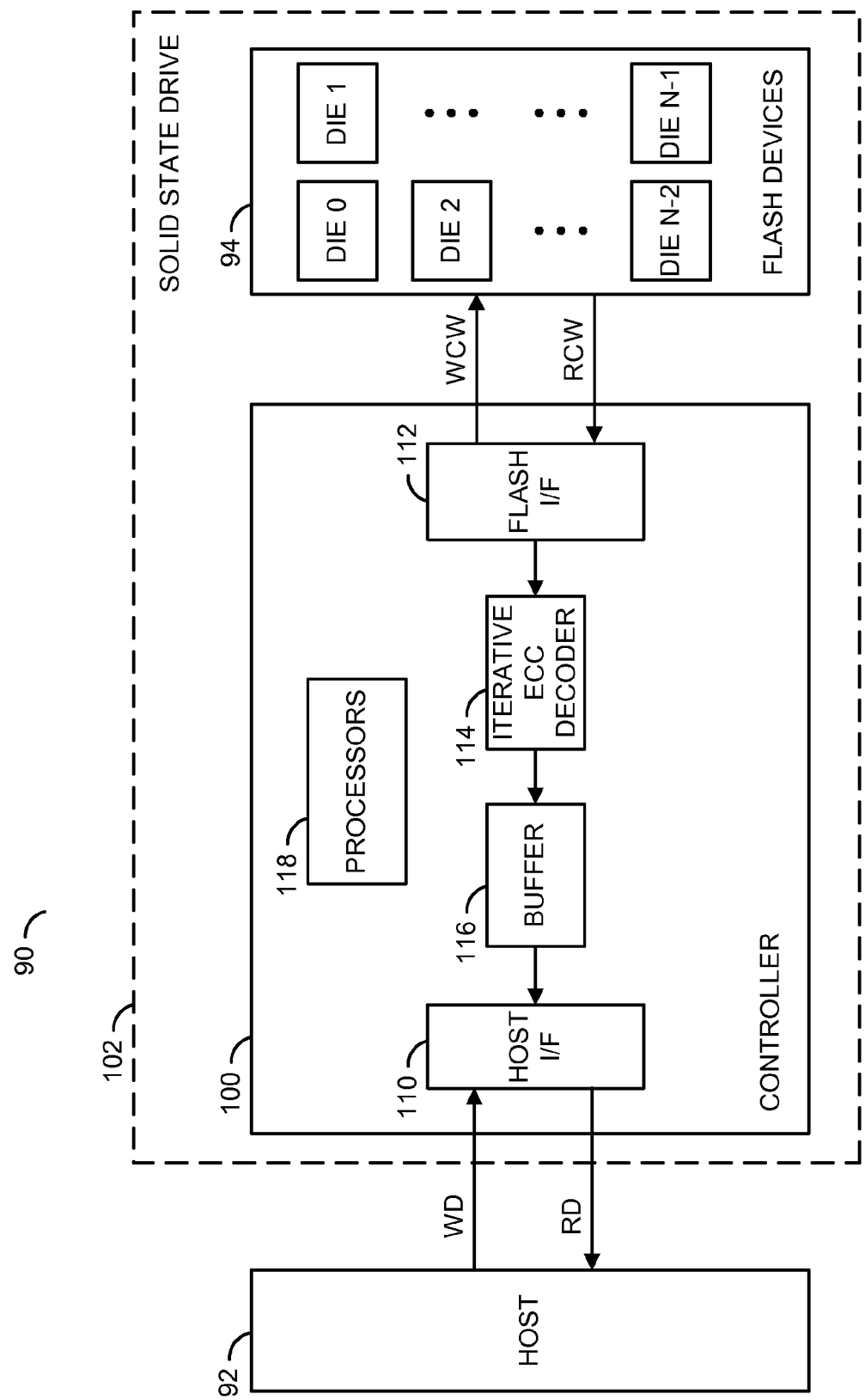
FIG. 1 is a block diagram of an example implementation of an apparatus.

Referring to FIG. 1, a block diagram of an example implementation of an apparatus 90 is shown. The apparatus (or circuit or device or integrated circuit) 90 implements a computer having a nonvolatile memory circuit. The apparatus 90 generally comprises a block (or circuit) 92, a block (or circuit) 94 and a block (or circuit) 100. The circuits 92 to 100 may represent modules and/or blocks that may be implemented as hardware, software, a combination of hardware and software, or other implementations. A combination of the circuits 94 and 100 form a solid-state drive 102.

A signal (e.g., WD) is generated by the circuit 92 and presented to the circuit 100. The signal WD generally conveys write data to be stored in the circuit 94. A signal (e.g., WCW) is generated by the circuit 100 and transferred to the circuit 94. The signal WCW carries error correction coded (e.g., ECC) write codewords written into the circuit 94. A signal (e.g., RCW) is generated by the circuit 94 and received by the circuit 100. The signal RCW carries error correction coded codewords read from the circuit 94. A signal (e.g., RD) is generated by the circuit 100 and presented to the circuit 92. The signal RD carries error corrected versions of the data in the signal RCW.

The circuit 92 is shown implemented as a host circuit. The circuit 92 is generally operational to read and write data to and from the circuit 94 via the circuit 100. When writing, the circuit 92 presents the write data in the signal WD. The read data requested by the circuit 92 is received via the signal RD.

The circuit 94 is shown implemented as a nonvolatile memory circuit. According to various embodiments, the circuit 94 comprises one or more: nonvolatile semiconductor devices, such as NAND flash devices, Phase Change Memory (e.g., PCM) devices, or Resistive RAM (e.g., ReRAM) devices; portions of a solid-state drive having one or more nonvolatile devices; and any other volatile or nonvolatile storage media. The circuit 94 is generally operational to store data in a nonvolatile condition.

The circuit 100 is shown implemented as a controller circuit. The circuit 100 is generally operational to control reading to and writing from the circuit 94, such as in response to commands received from the circuit 92. The circuit 100 is generally configured to (i) read a plurality of codewords from a block in the circuit 94 based on a program/erase count associated with the block, (ii) count a number of iterations used to decode the codewords and (iii) decrease a code rate of an error correction coding used to program the block in response to the number of iterations exceeding a threshold. The circuit 100 may be implemented as one or more integrated circuits (or chips or die) in any controller used for controlling one or more solid-state drives, embedded storage, nonvolatile memory devices, or other suitable control applications.

The circuit 100 generally comprises a block (or circuit) 110, a block (or circuit) 112, a block (or circuit) 114, a block (or circuit) 116 and one or more blocks (or circuits) 118. The circuits 110 to 118 may represent modules and/or blocks that may be implemented as hardware, software, a combination of hardware and software, or other implementations.

The circuit 110 is shown implemented as a host interface circuit. The circuit 110 is operational to provide communication with the circuit 92 via the signals WD and RD. Other signals may be implemented between the circuits 92 and 110 to meet the criteria of a particular application.

The circuit 112 is shown implemented as a nonvolatile memory (e.g., Flash) interface circuit. The circuit 112 is operational to provide communication with the circuit 94 via the signals WCW and RCW. Other signals may be implemented between the circuits 94 and 112 to meet the criteria of a particular application.

The circuit 114 is shown implemented as an iterative error correction code decoder circuit. The circuit 114 is operational to run decoding iterations until a correct code word is found, called convergence, and to optionally and/or selectively report a decoding failure if a specified maximum number of iterations is exceeded. Earlier convergence is preferred to later convergence. Therefore, an actual number of iterations vary as a function of the input raw codeword to the circuit 114, a signal to noise ratio and/or a raw bit error rate. The more iterations used to correct errors, the longer the decoding time and therefore the lower the throughput performance. In some embodiments, the circuit 114 is implemented as one or more low-density parity-check decoder circuits. The circuit 114 is operational to perform both hard-decision (e.g., HD) decoding and soft-decision (e.g., SD) decoding of the codewords received from the circuit 112. The soft-decision decoding generally utilizes the decoding parameters buffered in the circuit 116.

The circuit 116 is shown implemented as a buffer circuit. The circuit 116 is operational to buffer decoded data received from the circuit 114. The circuit 116 is also operational to buffer decoding parameters used by the circuit 114.

According to various embodiments, to maximize throughput in the presence of the variable decoding rate of the circuit 114 due to the variable number of iterations, one or more of: the circuit 112 includes buffering for codewords read from the circuit 94; and codewords read from the circuit 94 are buffered in the circuit 116 prior to being decoded by the circuit 114.

The circuit 118 is shown implemented as one or more processor circuits. The circuits 118 are operational to command and/or assist with multiple read/write requests while the iterative decoding is taking place. The circuits 118 also control one or more reference voltages used in the circuit 94 to read the codewords and generate the decoding parameters.

The circuit 100 has multiple targets (or objectives) for the iterative decoding operations. For a performance target, the circuit 100 has a throughput target related to the read performance. To meet the performance target, the statistics are monitored and adjustments are made to the decoding operations accordingly. The statistics include, but are not limited to, an average number of iterations and a hard-decision (e.g., HD) decoding failure rate. Furthermore, if the hard-decision decoding fails, the circuit 100 starts a retry that takes more time. Therefore, the hard-decision decoding failure rate (or retry rate) is kept low to meet the performance target. For an over provisioning target, the apparatus 90 has a user capacity target. If too many blocks have too-low code rates and/or are retired, the user capacity target cannot be met.

Other targets are considered in various embodiments of the invention. For example, the circuit 100 makes sure an uncorrectable bit error rate after the error correction code decoding reaches a target (e.g., a $10^{15}$ error rate target). Since both the average number of iterations (affecting performance) and the uncorrectable bit error rate are functions of the raw bit error rate and/or the signal-to-noise ratio, optimizing the code rate in response to the raw bit error rate and/or the signal-to-noise ratio can achieve both the performance target and the uncorrectable bit error rate target.

Another target that may be considered is a random write performance target. The random write performance target generally does not depend on the decoder throughput, but varies with an amount of free space in available the circuit 94. The free space is reflected in the over provisioning constraint. Where an encoding throughput is not a bottleneck, the random write performance target is meet by specifying the over provisioning criteria to meet both the random write performance target and the user capacity target.

The code rate management may also take into consideration the various levels of importance for different types of data. For example, system data is more important than user data and therefore the circuit 100 generally applies a lower code rate to the system data than the user data.

In some embodiments, a granularity of the code rate adjustment is per block (or group of blocks) such that each block (or group of blocks) has an individual code rate. The individual block code rates are achieved by maintaining a per-block code rate table for each physical block (or group of blocks) in the solid-state drive 102. When a system-level policy indicates a code rate change is appropriate, the table is updated. A copy of the table is maintained in the circuit 94 as part of the system data. A program/erase granularity is an R-block. The policy may be extended to other code rate adjustment granularities.

An R-block is a collection of nonvolatile memory blocks (e.g., a block from each nonvolatile memory die in the circuit 94, the nonvolatile memory locations within the blocks being written in a striped fashion). A block is a smallest quantum of erasing. A page is a smallest quantum of writing. A read unit (or codeword or Epage or ECC-page) is a smallest quantum of reading and error correction. Each page generally includes an integral number of read units.

An index is used in the circuit 100 to refer to each available code rate. As the code rate decreases, the code rate index increases. A highest code rate index value indicates a lowest code rate. A bad or retired block may be flagged with a special code rate index.

The code rate policy generally has multiple parts: a read scrub code rate test and a read failure code rate test. The code rate index may or may not change during or in response to the tests. However, the code rates generally do not increase in or due to the tests. Furthermore, the code rate policy does not lower the code rates (e.g., increase the code rate index) based on transient noises. Transient noises are noise factors that are eliminated by an erase/program operation. For example, retention noise is transient since erasing the offending block and programming the data into another block would eliminate the retention effect. Read disturb is another example of transient noise.

The read scrub code rate test is a background task triggered at defined events. In some embodiments, the events may be predefined program/erase counts of each block. The program/erase cycling is considered a non-transient noise factor. The predefined program/erase counts are fixed numbers (e.g., every 100 program/erase counts). The predefined program/erase counts may be equally or unequally spaced. Each time the program/erase count reaches one of the fixed numbers (or predefined values), the circuit 100 enters the read scrub code rate test immediately after an erase/program to avoid interference from other transient noise factors. In some embodiments, the triggering event may be a certain percentage of a specified device life (e.g., 10%, 20%, 25%, 30%, . . . ) of a manufacturer specified endurance. Each time a triggering event occurs, the circuit 100 enters the read scrub code rate test.

Figure 2:
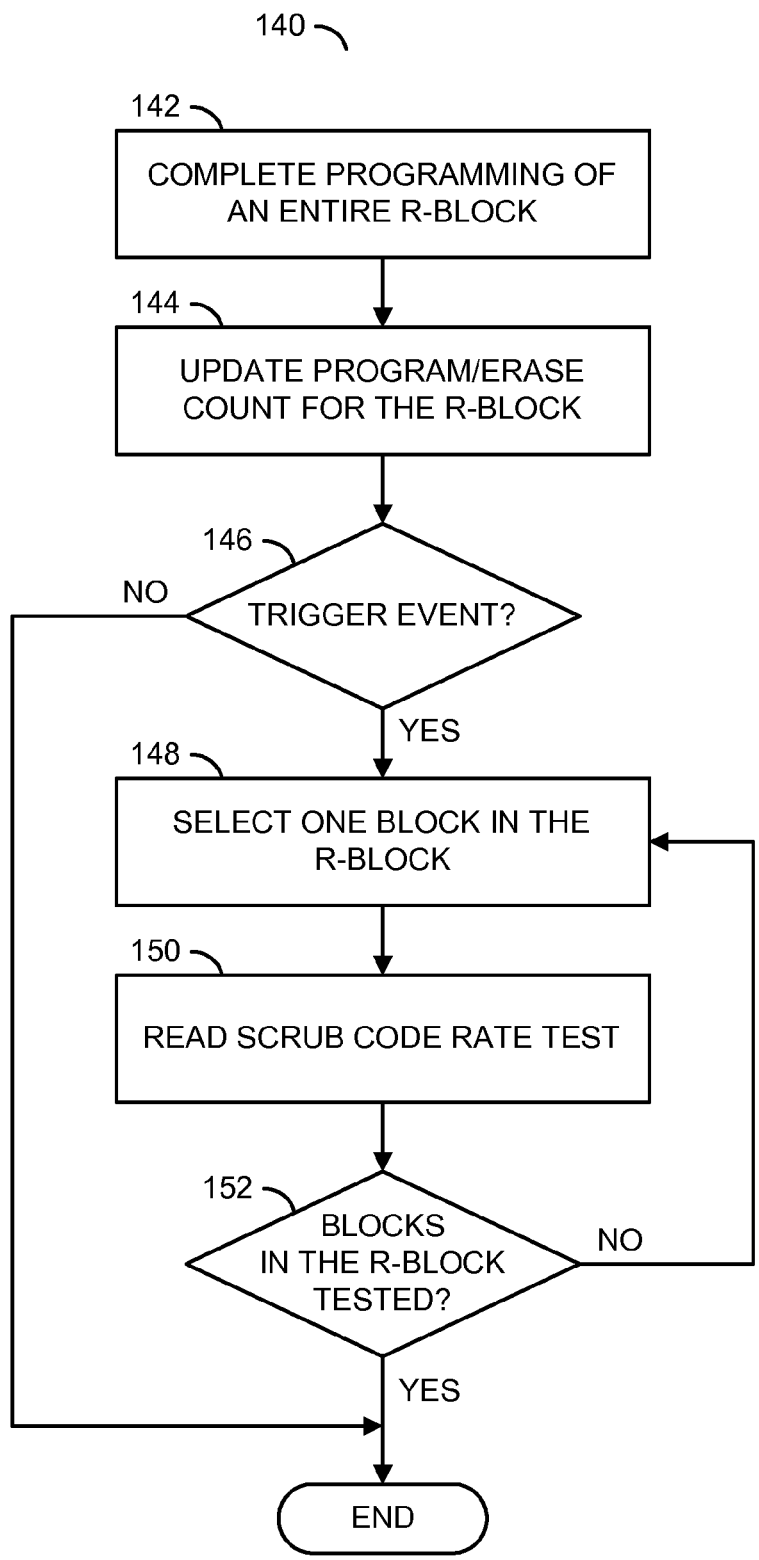
FIG. 2 is a flow diagram of a method for triggering a read scrub code rate test.

Referring to FIG. 2, a flow diagram of an example implementation of a method 140 for triggering the read scrub code rate test is shown. The method (or process) 140 is implemented by the circuit 100. The method 140 generally comprises a step (or state) 142, a step (or state) 144, a step (or state) 146, a step (or state) 148, a step (or state) 150 and a step (or state) 152. The steps 142 to 152 may represent modules and/or blocks that may be implemented as hardware, software, a combination of hardware and software, or other implementations. The sequence of the steps is shown as a representative example. Other step orders may be implemented to meet the criteria of a particular application.

The method 140 generally begins upon completion of programming an entire R-block (or other granularity of programming and/or allocation) in the step 142. In the step 144, the circuit 100 updates a program/erase count for the just-programmed R-block. A check is performed in the step 146 to see if a triggering event has taken place. In some embodiments, the triggering event may be the program/erase count reaching one of the fixed numbers. In other embodiments, the triggering event may be the circuit 94 reaching one of the specified percentages of the device life. In still other embodiments, the triggering event may be a specified elapsed amount of time (or interval) since the last triggering event (e.g., a month). In some embodiments, the triggering event may be an earlier of (i) the program/erase count reaching one of the fixed numbers or (ii) the specified elapsed amount of time since the last test. In various embodiments, detecting the triggering event and performing the read scrub test shortly after programming advantageously enables the read scrub test to observe an error rate of the nonvolatile memory without time-based effects such as retention and/or usage-based effects such as read disturb increasing the intrinsic error rates.

When no triggering event is detected, the method 140 may wait for a next possible triggering event. Detecting a triggering event causes the circuit 100 to select a block in the R-block in the step 148. According to various embodiments, the blocks in the R-block are selected in one or more of: a forward order; a backward order; a random order; an order according to a current code rate of the blocks; and any combination thereof. The read scrub code rate test is performed for the selected block in the step 150. If more blocks should be tested, the step 152 returns the method 140 to the step 148 where another block is selected. Otherwise, the method 140 waits for another triggering event. In some embodiments, the read scrub code rate test performed in the step 150 may be applied to all of the blocks within the R-block. In other embodiments, the read scrub code rate test may be applied to a subset (e.g., a representative subset) of the blocks in the R-block.

The read scrub code rate test divides the available code rates into multiple (e.g., two) tiers. For example, tier-2 code rates are lower than in tier-1. When the circuit 100 adjusts the code rates from the tier-1 range into the tier-2 range, the circuit 100 monitors a total number of tier-2 code rate blocks to ensure that the total number does not exceed a certain percentage (e.g., 5%) of all blocks in the circuit 94. The percentage is a function of the code rates in tier-2, a capacity of the circuit 94, and application criteria (e.g., a specified over-provisioning or enterprise vs. client priorities). A reason is that lower rate iterative codes provide strong protection and therefore good endurance, but lower rate iterative codes also take longer to decode for the same amount of user data. The longer decodes lead to a lower throughput. Normally a lower rate iterative decoder converges faster, meaning it takes fewer number of iterations to converge, than a higher rate iterative decoder. Hence, the lower rates improve the throughput. The throughput improvement may or may not compensate for the throughput loss due to more parity processing, depending on the operating region of the hard-decision decoder. If the net effect on throughput is that the lower rate decoder has lower throughput, and too many blocks use very low code rates, the overall performance may not meet the target at an end of life.

The read scrub code rate test is designed to meet the performance target. For tier-1 code rates, each code rate has a pre-computed target average number of iterations (e.g., TANI) to ensure that the decoding throughput target is met at the target average. For an iterative decoder, the throughput is inversely proportionally to the actual average number of decoding iterations. Given a particular decoder architecture, pre-computing the specified target average number of iterations given a code rate and a target decoding throughput is straightforward. Table I gives an example of a target average number of iterations table. Without loss of generality, the example shown in Table I does not specify the target average number of iterations for the tier-2 code rates to simplify the policy.

TABLE I

| Tier | Code rate | Code rate index | Target average number of iterations |
|---|---|---|---|
| 1 | 0.949 | 0 | 3.7 |
|  | 0.927 | 1 | 3.4 |
|  | 0.905 | 2 = IRMAX1 | 3.2 |
| 2 | 0.877 | 3 | N/A |
|  | 0.851 | 4 = IRMAX2 | N/A |
| Bad blocks | 0.0 | 5 | N/A |

The embodiment shown in Table I uses two tiers of code rates and the code rate adjustment criterion is different in each tier. IRMAX1 is the index of the lowest code rate in tier-1, and IRMAX2 is the index of the lowest code rate in tier-2. In other embodiments, a single tier may be defined for the code rates. For example, set IRMAX1 to a maximum allowable value and use the same code rate adjustment criteria for all code rates, rather than having two separate tiers with different criteria.

Figure 3:
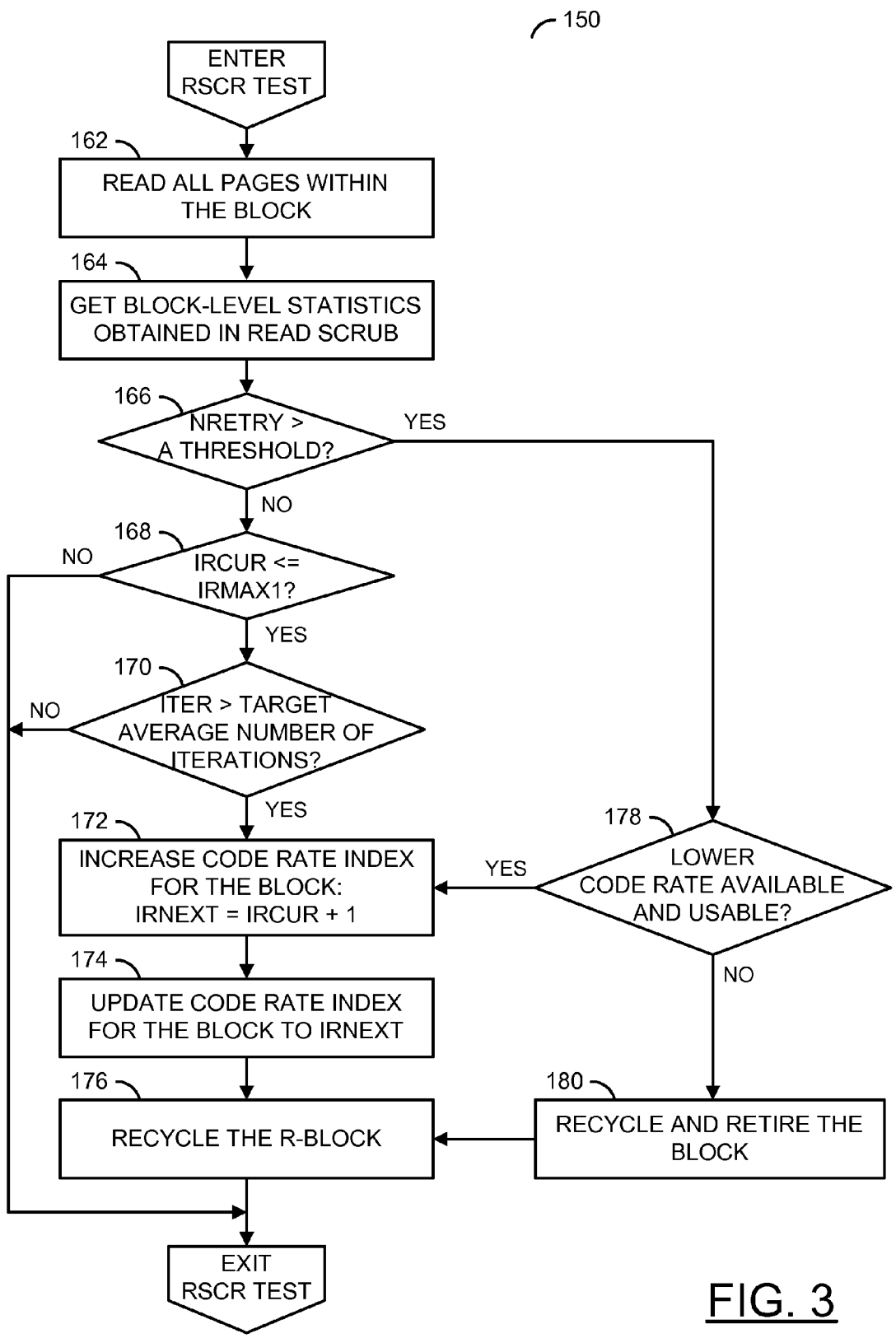
FIG. 3 is a flow diagram of an example implementation of the read scrub code rate test in accordance with an embodiment of the invention.

Referring to FIG. 3, a flow diagram of an example implementation of the read scrub code rate test 150 is shown in accordance with an embodiment of the invention. The test steps (or method or process) 150 are implemented by the circuits 94 and 100. The method 150 generally comprises a step (or state) 162, a step (or state) 164, a step (or state) 166, a step (or state) 168, a step (or state) 170, a step (or state) 172, a step (or state) 174, a step (or state) 176, a step (or state) 178 and a step (or state) 180. The steps 162 to 180 may represent modules and/or blocks that may be implemented as hardware, software, a combination of hardware and software, or other implementations. The sequence of the steps is shown as a representative example. Other step orders may be implemented to meet the criteria of a particular application.

In the step 162, the circuit 100 reads all pages within the block undergoing the test. Block-level statistics obtained in the read scrub are gathered in the step 164. A check is performed in the step 166 to determine if the number of retries (e.g., an average number of retries per page, a total number of retries or a median number of retries) is below a threshold. The retries (e.g., NRETRY) are generally based on the number of times an Epage fails a hard-decision decode iteration. If the number of retries is below the threshold, a check is performed in the step 168 to determine if the current code rate index (e.g., IRCUR) of the block is in tier-1 (e.g., IRCUR≤IRMAX1). If not, the method 150 exits. If the current code rate index is in tier-1, a check is performed in the step 170 to determine if the average number of iterations for the hard-decision decoding (e.g., ITER) is greater than a target average number of iterations. If not, the method 150 exits. If the average number of iterations exceeds the target average number, a next code rate index of the block is calculated in the step 172 (e.g., IRCUR=IRCUR+1). In the step 174, the code rate index of the block is updated to the calculated next code rate index. The block is recycled in the step 176 and the method 150 exits.

If the number of retries NRETRY is found to be greater than the threshold in the step 166, a check is performed in the step 178 to determine if a lower code rate is available and usable. If a lower code rate is available and use of that lower code rate still meets the over provisioning target (e.g., (IRCUR≤IRMAX1) OR ((IRCUR<IRMAX2) AND (a number of tier-2 code rate blocks<a predefined percentage of the total number of blocks))), the code rate index for the block is increased in the steps 172 and 174. If no lower code rates are available the block is recycled and retired in the step 180. Thereafter, the method 150 exits.

Figure 4:
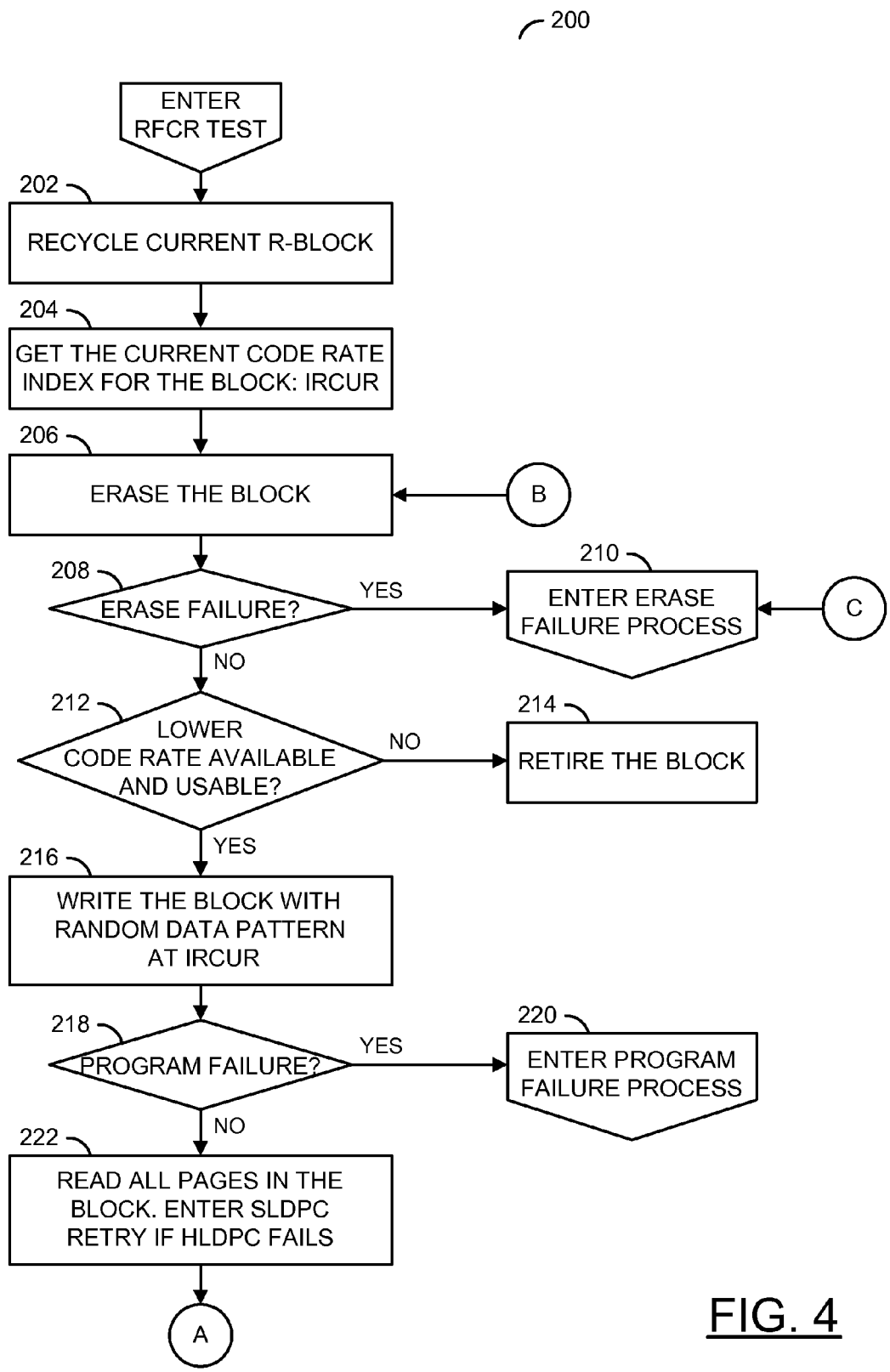
FIG. 4 is a flow diagram of an example implementation of a read failure code rate test.
Figure 5:
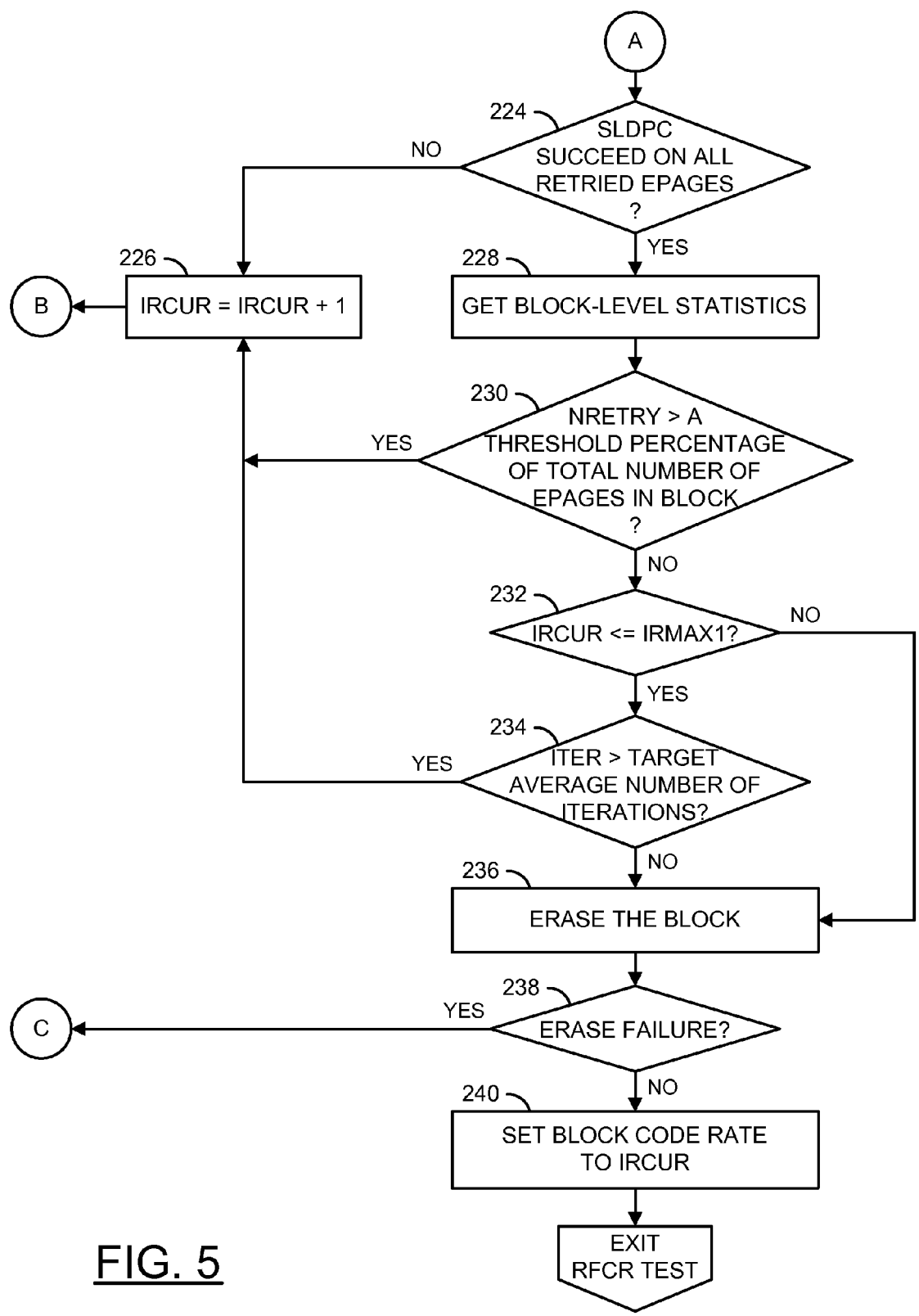
FIG. 5 is a continuation of the flow diagram of the read failure code rate test.

Referring to FIG. 4, a flow diagram of an example implementation of a read failure code rate test 200 is shown. Referring to FIG. 5, a continuation of the flow diagram of the read failure code rate test is shown. The method (or process) 200 is implemented by the circuits 94 and 100. The method 200 generally comprises a step (or state) 202, a step (or state) 204, a step (or state) 206, a step (or state) 208, a step (or state) 210, a step (or state) 212, a step (or state) 214, a step (or state) 216, a step (or state) 218, a step (or state) 220, a step (or state) 222, a step (or state) 224, a step (or state) 226, a step (or state) 228, a step (or state) 230, a step (or state) 232, a step (or state) 234, a step (or state) 236, a step (or state) 238 and a step (or state) 240. The steps 202 to 240 may represent modules and/or blocks that may be implemented as hardware, software, a combination of hardware and software, or other implementations. The sequence of the steps is shown as a representative example. Other step orders may be implemented to meet the criteria of a particular application.

The read failure code rate (e.g., RFCR) test is designed to perform on-demand code rate adjustment when certain reads from a block fail. The exact condition of triggering the read failure code rate test may vary depending on the criteria of a particular application. In some embodiments, the method (or test) 200 is triggered when both of the following conditions are met. A soft-decision retry fails on one or more Epages in the block. Furthermore, the circuit 100 determines that the failure is not due to transient noise factors, such as retention and/or read disturb.

Since the read failure code rate test is performed on-demand, various techniques of deriving the code rate adjustment criteria exist. In some embodiments, the raw bit error rate of the block is determined and a code rate based on that raw bit error rate is assigned. In other embodiments (e.g., FIGS. 4 and 5), instead of assigning a code rate index in a single calculation, the policy increases the code rate index by one unit at a time and subsequently tests whether the performance criteria are still met. Furthermore, since the read failure code rate test is triggered by a soft-decision decoding failure, the test may rerun the soft-decision decoding after the code rate adjustment is made, at least immediately (or shortly with respect to factors such as retention) after an erase/program operation.

The read failure code rate test (method 200) is entered in response to a failure to decode a codeword as read from a block. The failure to decode generally means a failure to decode in one or more steps of a decoding procedure comprising read retry operations. The codeword may possibly be decodable with more heroic techniques, but is still treated as a failure if not successfully decoded at or before a specified one of the steps in the decoding procedure.

In the step 202, the current R-block associated with the failure is recycled. The current code rate index (e.g., IRCUR) for the block associated with the failure is obtained in the step 204. The circuit 100 erases the block in the step 206. If the erasing process fails per the step 208, an erase failure process 210 is entered. If the erasing succeeds, a check is performed in the step 212 to determine if a lower code rate is available and usable (e.g., (IRCUR=IRMAX2) OR ((IRCUR>IRMAX1) AND (the number of tier-2 code rate blocks<a predefined percentage of the total number of blocks))). If not, the block is retired in the step 214. If the code rate can be lowered and the block remains usable, a random data pattern is programmed (or written) into the block in the step 216. If the programming fails per the step 218, a program failure process 220 is entered. If the programming succeeds, all pages in the block are read in the step 222. A soft-decision retry is used if the hard-decision decode fails.

In the step 224 (FIG. 5), a check is made to determine if the soft-decision decoding succeeds on all retried Epages. If not, the current code rate index value is incremented (e.g., IRCUR=IRCUR+1) in the step 226. The method 200 returns to the step 206 (FIG. 4) and erases the block.

If the soft-decision decoding fails for one or more retried Epages per the step 224, the circuit 100 gathers the block-level statistics in the step 228. The statistics generally include, but are not limited to, the number of Epages that failed the hard-decision decoding (e.g., NRETRY) and the average number of iterations for the hard-decision decoding (e.g., ITER). Failures during the steps 222 and 224 generally include, but are not limited to, a failure of the hard-decision decoding, a failure of the soft-decision decoding and/or a metric involving a total time spent attempting to decode.

A check is performed by the circuit 100 in the step 230 to determine if the number of Epages that failed the hard-decision decoding exceeds a threshold percentage of the total number of Epages in the block. If the number of Epage that failed exceeds the threshold percentage in the step 230, the current code rate index is increased in the step 226 and the method 200 returns to the step 206 to erase the block.

If the number of Epages that failed is not above the threshold percentage in the step 230, a check is performed in the step 232 to determine if the current code rate index is in tier-1 (e.g., IRCUR≤IRMAX1). If the current code rate index is in tier-1, a check is performed in the step 234 to determine if the average number of iterations (e.g., ITER) for the hard-decision decoding is greater than a target average number of iterations. If the average number of iterations exceeds the target average in the step 234, the current code rate index is increased in the step 226 and the current block is erased in the step 206. If not, or if the current code rate index is not in tier-1 per the step 232, the block is erased in the step 236. If an erasing failure is detected in the step 238, the erase failure process 210 is entered. If the erasing succeeds, the current code rate index for the block is updated to use the last-tested code rate (e.g., IRCUR) in the step 240. Thereafter, the read failure code rate test exits.

For each physical block in the circuit 94, a last possible code rate adjustment is retirement (e.g., the block is marked as bad). Retirement effectively makes the associated code rate zero. A retired (or bad) block may also be considered as a tier-3 code rate block. No performance criterion exists for the retired/bad blocks since no data is stored therein. A limitation for retirement is the over provisioning target. Therefore, the number of bad blocks should not exceed what the over provisioning constraint allows. In some embodiments, the following steps may be used when a block should be retired either by the read scrub code rate test or the read failure code rate test. First, a current number of bad blocks as a percentage of the total number of blocks in the circuit 94 is calculated. If the current number of bad blocks does not exceed a pre-computed target (constrained by the over provisioning criteria), the block is retired by updating the per-block code rate table. Otherwise, an error message is sent to the circuit 92 for further consideration and actions.

The bad block percentage target may also be a function of the percentage of tier-2 code rate blocks if the lower code rates in tier-2 are using more parity than a manufacturer specified spare bytes per page. By using lower code rates for some of the worst blocks rather than retiring such blocks, an overall effect is improved over provisioning and therefore an increased longevity for the solid-state drive.

The circuit 100 generally support multiple code rates. Adaptive code rate management improves endurance of the circuit 94 and increases a longevity of the solid-state drive 102. At a beginning of life of the drive, higher code rates are used to store more user data. The higher code rates lead to more effective over provisioning and improved endurance. As an age of the circuit 94 nears an end of life, lower code rates are used for worsening blocks rather than declaring such blocks as bad. The lower code rates also improve the overall life of the circuit 94.

The functions performed by the diagrams of FIGS. 1-5 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to process a plurality of read/write operations to/from a memory; and
   a control circuit configured to (i) read all codewords from a block in the memory in response to one or more trigger events, wherein the trigger events occur when (a) a program/erase count of the block reaches a predetermined value and (b) a predetermined time elapses since a previous trigger event and before the program/erase count reaches the predetermined value, (ii) count a number of iterations used to decode the codewords read from the block and (iii) decrease a code rate of an error correction coding used to program the block where the number of iterations exceeds a threshold.

2. The apparatus according to claim 1, wherein the apparatus comprises a solid-state drive controller.

3. The apparatus according to claim 1, wherein (i) the control circuit comprises an iterative decoder configured to decode the codewords and (ii) the iterations are an average number of iterations used by the iterative decoder to decode the codewords.

4. The apparatus according to claim 1, wherein the control circuit is further configured to test an ability of the block to store a plurality of test codewords in response to a failure to decode another codeword as read from the block.

5. The apparatus according to claim 4, wherein the control circuit is further configured to decrease the code rate in response to a failure of the test by the block.

6. The apparatus according to claim 4, wherein the control circuit is further configured to (i) count a number of other failures to decode the test codewords as read from the block and (ii) decrease the code rate where the number of other failures exceeds a test threshold.

7. The apparatus according to claim 4, wherein the control circuit is further configured to (i) count a number of additional iterations used to decode the test codewords and (ii) decrease the code rate where the number of additional iterations exceeds a test threshold.

8. The apparatus according to claim 1, wherein the control circuit is further configured to (i) count a number of failures to decode the codewords, (ii) check that the block is still usable where the number of failures exceeds a failure threshold and (iii) decrease the code rate where the block is still usable and above a lowest code rate.

9. The apparatus according to claim 8, wherein the control circuit is further configured to retire the block where the block is unusable at the lowest code rate.

10. The apparatus according to claim 1, wherein the apparatus is implemented as one or more integrated circuits.

11. A method for error code rate management, comprising the steps of:
    (A) reading all codewords from a block in a memory in response to one or more trigger events, wherein the trigger events occur when (i) a program/erase count of the block reaches a predetermined value and (ii) a predetermined time elapses since a previous trigger event and before the program/erase count reaches the predetermined value;
    (B) counting a number of iterations used to decode the codewords read from the block; and
    (C) decreasing a code rate of an error correction coding used to program the block where the number of iterations exceeds a threshold.

12. The method according to claim 11, wherein the method is implemented in a solid-state drive controller.

13. The method according to claim 11, wherein (i) the decode of the codewords uses an iterative decoder and (ii) the iterations are an average number of iterations used by the iterative decoder to decode the codewords.

14. The method according to claim 11, further comprising the step of:
    testing an ability of the block to store a plurality of test codewords in response to a failure to decode another codeword as read from the block.

15. The method according to claim 14, further comprising the step of:
    decreasing the code rate in response to a failure of the testing by the block.

16. The method according to claim 14, further comprising the steps of:
    counting a number of other failures to decode the test codewords as read from the block; and
    decreasing the code rate where the number of other failures exceeds a test threshold.

17. The method according to claim 14, further comprising the steps of:
    counting a number of additional iterations used to decode the test codewords; and
    decreasing the code rate where the number of additional iterations exceeds a test threshold.

18. The method according to claim 11, further comprising the steps of:
    counting a number of failures to decode the codewords;
    checking that the block is still usable where the number of failures exceeds a failure threshold; and
    decreasing the code rate where the block is still usable and above a lowest code rate.

19. An apparatus comprising:
    a memory configured to process a plurality of read/write operations; and
    a controller configured to (i) read all codewords from a block in the memory in response to one or more trigger events, wherein the trigger events occur when (a) a program/erase count of the block reaches a predetermined value and (b) a predetermined time elapses since a previous trigger event and before the program/erase count reaches the predetermined value, (ii) count a number of iterations used to decode the codewords read from the block and (iii) decrease a code rate of an error correction coding used to program the block where the number of iterations exceeds a threshold.

20. The apparatus according to claim 19, wherein the apparatus comprises a solid-state drive.

* * * * *